(12) United States Patent
Parker et al.

(10) Patent No.: US 7,761,803 B2
(45) Date of Patent: *Jul. 20, 2010

(54) VIRTUAL REALITY INTERFACE FOR SHOW CONTROL

(75) Inventors: Richard Parker, Birmingham (GB); William Hewlett, Birmingham (GB)

(73) Assignee: Production Resource Group, Inc., New Windsor, NY (US)

( * ) Notice: Subject to any disclaimer, the term of this patent is extended or adjusted under 35 U.S.C. 154(b) by 2329 days.

This patent is subject to a terminal disclaimer.

(21) Appl. No.: 10/437,648

(22) Filed: May 13, 2003

(65) Prior Publication Data

US 2004/0021689 A1 Feb. 5, 2004

Related U.S. Application Data

(62) Division of application No. 08/847,174, filed on Apr. 1, 1997, now Pat. No. 6,563,520.

(60) Provisional application No. 60/016,672, filed on May 1, 1996.

(51) Int. Cl.
*G06F 3/048* (2006.01)

(52) U.S. Cl. .................. 715/771; 700/97; 700/214; 700/217; 703/4

(58) Field of Classification Search ................ 715/771, 715/777, 748–852; 700/96–98, 108, 213–217, 700/302–305; 703/4, 13–22
See application file for complete search history.

(56) References Cited

U.S. PATENT DOCUMENTS

| 4,843,568 | A | | 6/1989 | Krueger et al. |
| 5,239,373 | A | | 8/1993 | Tang et al. |
| 5,307,295 | A | * | 4/1994 | Taylor et al. ............ 703/1 |
| 5,406,176 | A | * | 4/1995 | Sugden ............ 315/292 |
| 5,423,554 | A | | 6/1995 | Davis et al. |
| 5,448,263 | A | | 9/1995 | Martin et al. |
| 5,481,669 | A | | 1/1996 | Poulton et al. |
| 5,483,254 | A | | 1/1996 | Powell |
| 5,483,261 | A | | 1/1996 | Yasutake |
| 5,485,172 | A | | 1/1996 | Sawachika et al. |
| 5,490,239 | A | | 2/1996 | Myers |
| 5,689,669 | A | | 11/1997 | Lynch et al. |
| 5,769,527 | A | * | 6/1998 | Taylor et al. ............ 362/85 |

* cited by examiner

*Primary Examiner*—Ba Huynh
(74) *Attorney, Agent, or Firm*—The Law Office of Scott C. Harris, Inc.

(57) ABSTRACT

A system for designing light and sound systems for use in stage productions. Virtual reality interfaces facilitate the selection and location of lighting and sound displays by providing a real-time simulation of the devices and the display produced thereby. The system also calculates parameters with respect to structural elements used for mounting the lighting and sound equipment. In addition, the virtual reality interface permits the simulation of the packing of the lighting and sound equipment and the automatic calculation of parameters relating to packing space, package weight, preferred location, and order of packing.

9 Claims, 6 Drawing Sheets

VIRTUAL REALITY INTERFACE FOR SHOW CONTROL

CROSS-REFERENCE TO RELATED APPLICATIONS

This application is a divisional (and claims the benefit of priority under 35 USC 120) of U.S. application Ser. No. 08/847,174, now U.S. Pat. No. 6,565,520 filed Apr. 1, 1997, which claims the benefit of U.S. provisional application Ser. No. 60/016,672, filed May 1, 1996.

FIELD OF THE INVENTION

The present invention relates to virtual reality control for planning and interacting with stage lighting design and production. More specifically, the present invention defines a virtual reality design system that facilitates interaction between a stage lighting designer and many aspects of the stage lighting event.

BACKGROUND OF THE INVENTION

The production of a modern stage performance is a complex undertaking. This is partially due to the complicated interaction of various effects created by the combination of lighting and sound apparatus. The designer of these effects combines all of these effects into a cohesive whole which furthers the artistic aims of the performance.

A myriad of details must be considered and planned in this design process. Designers or technicians must envision and create appropriate lighting and sound effects. That requires planning of numerous details of the equipment. These details include the location and operation of the equipment, wiring and location of the equipment at the desired locations, assembly and disassembly, and moving of this equipment between locations.

The design of stage lighting effects require the selection and configuration of numerous lighting fixtures, each of which has many adjustable parameters. For example, each light fixture can be adjusted in many ways, including position adjustment, intensity, color, and beam size. These parameters must be set to a very high degree of accuracy in order to satisfy the requirements of the designer. The effect also needs to be timed to coincide with the proper time in the show based on the musical program.

Previous design processes have used disorganized techniques for planning the operation, e.g., on paper, or by trial and error using actual equipment on a stage. To a certain extent, the designers must rely upon their own ability to visualize and predict the effects of a given lighting design.

Some progress has been made to improve the stage lighting design process by the use of computer lighting simulation systems such as MAC ICON, available from Light and Sound Design, Limited of Birmingham, England, and WYSIWIG, available from Flying Pig Systems, Inc. Both of these systems calculate and simulate lighting effects based on the lighting parameters that are indicative of a lighting show.

These lighting simulation systems produce a two-dimensional simulation of lighting effects on a stage. However, such systems are limited by the lack of realism in the two-dimensional display. Further, the complex user interfaces of these systems has generally restricted their use to designers having experience with such systems. Moreover, the two dimensional display of the inherently three dimensional effect has made it difficult for the designer to visualize the end result.

Once designers complete the lighting (and/or sound) design process, they must resolve a number of other practical issues before the desired effects can be implemented. This requires selecting appropriate lighting devices and parameter settings, and the dynamics and sequence of the desired effects.

The designer/technician must also configure electrical and structural systems to support and interconnect all of the lighting and sound apparatus in the appropriate location. The structural components include, for example, trusses and rigging, chains and chain motors which are used to raise the trusses and rigging. Also, each lighting fixture must be connected to cables which act as the source of power and control. Therefore, each show requires a routing plan to locate these cables in an efficient path from the fixtures to a source of power and/or control.

The lighting design also needs to account for the unique requirements of each stage. Conventionally, a drawing is used to model the stage to determine where the rigging, trusses and cables will be placed. This drawing is then used to determine where all of the cables will be routed, including the lighting fixtures, dimmer racks, consoles, or other locations. It is now common to use this drawing to locate the structural elements, and to decide what lengths of cables are required, by actually measuring the lengths on the scale drawing. Then, numerous cables are cut and constructed to the desired lengths.

Other structural considerations include determining the location in the building where trusses can be hung. Different points in the roof and walls of different structures have different loading capabilities. The designer must consider the weight and forces of these load points on the structure to ensure that known capacities of the structure are not exceeded.

Problems can arise with the above-described design process. For example, creating drawings is very time consuming. Errors often occur in measurements made using these drawings. There may not be time to correct such errors given the severe time constraints in the construction of stage performances. This is particularly true in shows that travel frequently. Also, calculation of structural load values and limits is time consuming and prone to human error.

Moving the lighting and sound equipment presents another challenge for stage production. Crews assemble, disassemble, pack, and transport lighting and sound equipment. Loading these items onto a truck requires careful consideration of many factors, which is usually done by a highly experienced road boss. For example, some fixtures ride better in certain parts of the truck. It may be desirable to locate heavier items, such as dimmer racks, towards the front of the truck. Once a certain amount of weight has been placed on one portion of the truck, additional heavy items should be placed on another part of the truck, or in a separate truck.

It is also important to consider the stacking ability of each item. This defines the kinds of items, and the maximum weight, that can be placed on top of a given item without causing damage. It is important to consider the size and arrangement of items to optimize usage of truck space. This minimizes the number and size of the trucks.

The sequence of packing and unpacking is also important. For example, since trusses support the entire lighting apparatus, packing them in the front of the truck necessitates unloading the entire truck before set up can begin. This dictates a preference for loading the trusses last so that they can be removed first. Similar considerations apply to rigging equipment, including motors, span sets and other devices used for handling trusses. There is no need to unload truss-hung lights until the trusses are unloaded. However, it is acceptable to unload floor mounted lights, at any time so they do not need to be packed in a specific location. Also, when multiple trucks are used, the road boss must consider which crews are packing and unpacking different areas at different times to avoid different crews interfering with each other.

Currently, all of these considerations enter into decisions regarding when and where to pack items in a truck. Performing this task often leads to inefficient truck packing, because of the difficulty in visualizing and planning for all of these packing considerations. Unfortunately, trial and error is slow and error prone. This can result in delays or damage to the equipment and/or truck.

Another problem is timing. Shows must be frequently put together and taken apart in order to allow them to arrive in the proper place at the proper time. Usually the road boss makes an estimate of how long the truck packing, driving, and unpacking will take, and tries to operate based on those estimates. However, this requires experience and is prone to errors. The actual operation could take much more or less time.

Another interesting feature noted by the inventors of the present invention was the possibility of simulation of a performance, using a karaoke style.

SUMMARY OF THE INVENTION

The inventors of the present invention have recognized all of the above needs arising from creating lighting and sound designs, and mounting, interconnecting and shipping the necessary equipment. They have realized that this is essentially a three-dimensional problem that is being solved using two dimensional tools.

The inventors recognized that the three dimensional user interface could facilitate entry of all of this data and information. The preferred user interface is a virtual reality operating system. This allows simulation of the three dimensional problem more accurately than by using two dimensional tools.

Virtual reality allows an individual to interact with a computer simulation in a three-dimensional virtual world using multi-dimensional and multi-sensory interactive interface devices. Because the human brain has a high degree of skill in recognizing spatial patterns, the complex relationships inherent in these design tasks are more readily apparent in a three dimensional visual-spatial display. Examples of such virtual reality devices include head mounted "eye phones" providing a visual display of a simulated scene; tactile sensitive gloves worn by the user for touching, pointing, and interacting with objects in the simulated display; sound input to the user corresponding to sounds generated in the simulation; and a voice recognition system responsive to the user's verbal commands. Hand and body motion sensors enhance the virtual reality experience by sensing turning of the user and then shifting the view in the visual display, just as the view would shift when turning in the real world. The combined result of these kinds of interfaces can generate a realistic sensation of actually existing in the virtual three dimensional environment. Virtual reality has been the subject of many patents and publications, including, for example, the book "Artificial Reality", by Myron Kruegger, and U.S. Pat. No. 5,423,554, which is herein incorporated by reference.

In view of the above-discussed issues in stage production and design, this invention uses virtual reality interfaces to provide the designer with an improved media to allow planning of various aspects of the stage lighting show.

One planning scheme is the simulation of the three-dimensional stage lighting effects.

Techniques are also described to simulate the apparatus producing the effects. This provides the designer with an accurate and intuitive control over the simulation, as well as an accurate view of lighting displays, scenery and other equipment including sound. This will improve the quality and efficiency of the design process.

Another virtual reality tool simulates the process of packing and unpacking lighting and sound stage equipment into a truck. This allows the user to interact with an apparently three dimensional simulation of the actual packing and unpacking process. Since the packing is being simulated on a computer, this also allows the computer to keep track of various aspects of the packing including any rules that may be violated by the packing.

For lighting design, the user inputs data regarding the characteristics of the stage and light fixtures, including the dimensions and constraints of the stage and building, the dimensions of each light fixture, the types of light fixtures, the point of reference on the stage, the location of each light fixture, and the parameters of each light fixture.

The user also inputs the type, dimension, and weight of each light apparatus and support structure, and their cabling requirements. Further, the user inputs the constraints of the building and light apparatus support structures. For the task of packing the light and sound equipment, the user inputs data regarding the characteristics of the truck and the packages. These include the dimensions of the interior of the truck, the dimensions of each package, the center of gravity, and preferences and constraints for each package. Alternately, a database for various standard types can be prestored into the computer. This database can also include information about any warning conditions, such as maximum unbalanced load and others.

Another system used by the present invention enables determination of how long the truck packing which is simulated during the truck packing exercise will actually take.

Yet another system of the present invention relates to setup of the eventual devices. The setup parameters allow the lighting fixtures to be placed in various locations on the stage. Proper operation of those fixtures is obtained by running cabling links to those locations, and calculation of safety parameters associated therewith.

The data input devices can include a keyboard, a disk drive, and virtual reality (VR) devices, such as interactive gloves and head mounted visual display of the type usually used as virtual reality input devices. The processing subsystem stores and processes all of the data about the characteristics of the stage and light fixtures, along with structural and packing data. The system then simulates the lighting effects, the apparatus producing these effects, and the packing environment.

The processing subsystem has a processor, a memory, and processor overhead hardware. The processor runs a simulation module and a virtual reality operating system. The simulation module simulates lighting effects, the light and sound equipment, their supporting structures, as well as the truck and its packages. The virtual reality operating system allows the user to enjoy real-time control over the simulation; it also produces a three-dimensional image showing the simulated elements and lighting effects. The three-dimensional image is displayed on display devices, including a monitor and an interactive helmet of the type usually used as a virtual reality display device.

The above described input data is used to form a computer-based simulation. The user can interact with this simulation by reaching into the virtual image and adjusting its characteristics. For example, if the user is not satisfied with the lighting effects on the stage, the user reaches into the virtual image of the stage and grabs one or more of the light fixtures. A drop down menu preferably appears, displaying characteristics of the light fixtures. The user can easily adjust a parameter of the light fixture by simply pointing to the parameter on the drop down menu. Alternatively, the user may use voice commands to modify the simulation. In the lighting design process, the user can adjust the position of the light fixture by simply grabbing the light fixture and pointing it in the desired direction. Another simulation displays the ICON™ control console which is normally used to control the lighting system, and allows the user to enter commands in VR space on the simulated console.

In the packing process, the user can reach into the virtual image of the truck and grab a package. The user can then place the package in the truck. If the package fits in the truck at the desired location, the virtual reality operating system produces a three-dimensional image showing the package in the truck at the selected location. Also, the user is notified if any of the input activities violate any of the design constraints placed on the system.

The location of devices can also be done in the VR space, by placing particular trusses/lamps in the desired location. The computer system prestores loading characteristics of the supports. When a load is placed in a loaded location, its weights and weight distribution are calculated to determine if any weight limitations have been exceeded.

The cabling and its routing are also calculated from the entered information, and diagrams facilitating the cabling and its layout can be prepared and used.

Yet another system enabled according to the present invention is an entirely new system of simulation. Previous simulation systems have been known, based on the Japanese "karaoke" style. These systems allow a user to sing or play along with musical accompaniment, and essentially become part of that musical accompaniment.

The present invention for the first time uses virtual reality to form a karaoke style simulation system. Preferably this is carried out by forming a simulation of, for example, a rock and roll band with or without lighting effects, playing the actual music. The user places himself in the virtual reality environment, essentially seeing himself in the presence of the rock and roll band and the stage lighting effects. This "ultimate karaoke" provides the ability to add and or remove aspects of the simulation, and to provide a more realistic simulation for the user.

BRIEF DESCRIPTION OF THE DRAWINGS

These and other aspects of the invention will now be described in detail with reference to the accompanying drawings, wherein.

DETAILED DESCRIPTION

Figure 1:
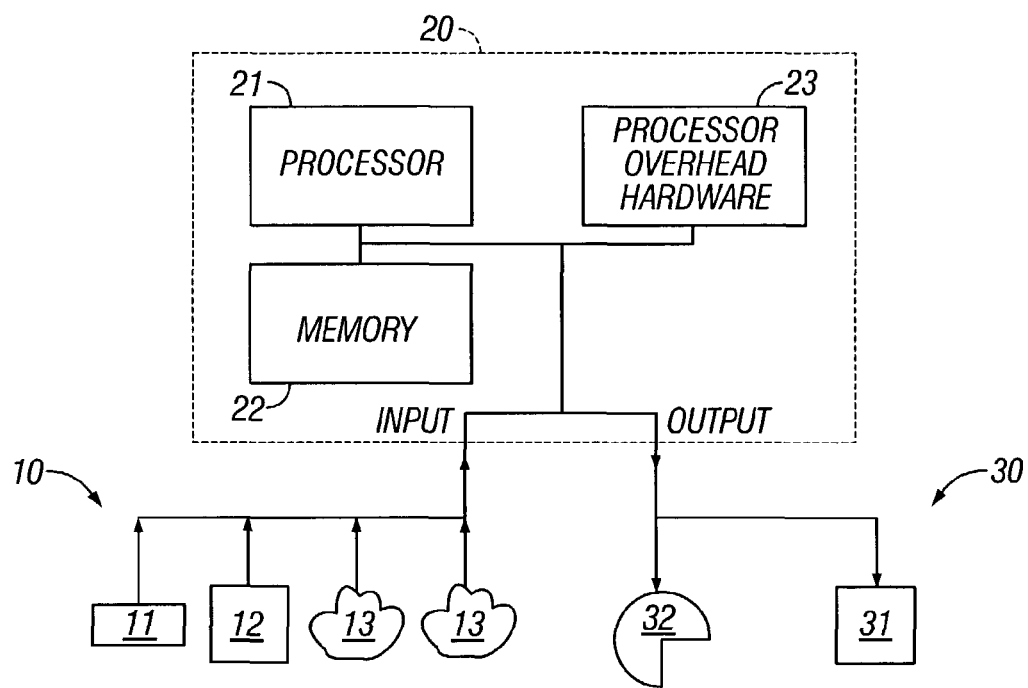
FIG. 1 shows a block diagram of the overall architecture of the virtual reality light and sound production design system of the invention.

FIG. 1 shows a block diagram of the overall architecture of a preferred embodiment of the virtual reality lighting and sound production design system forming the present invention. This embodiment includes data input devices 10, a processing subsystem 20, and display devices 30.

The system uses two different kinds of data: database information which is prestored and fixed, and user-input data. The database information includes information that is used by the system to carry out the simulation. This includes, for example, the sizes of the lighting fixtures and their weights, their lighting characteristics, and other information as explained throughout this specification. Site-specific information may also be stored to explain the characteristics of the site that is being lit. This site-specific information includes the sizes of the lighted area, information indicative of its structures and hookup. Data regarding the characteristics of the stage and light fixtures is entered via the data input devices 10 in a conventional manner. This includes input of data such as the characteristics of the building and stage, lighting fixtures and support structures and packing information. The data input devices 10 may include a keyboard 11 with mouse, a disk drive 12, interactive gloves 13, and a microphone 14 of the type usually used as virtual reality input devices. For example, the interactive gloves 13 may be the DATAGLOVE available from VPL Research, or the CYBERGLOVE available from Virtual Technologies.

The processing subsystem 20 stores and processes the data regarding the characteristics of the stage, lighting and sound equipment. The processing subsystem 20 also simulates the desired effects. The processing subsystem 20 includes a processor 21, a memory 22, and processor overhead hardware 23. The processor 21 runs a simulation module (such as MAC ICON) and a virtual reality operating system. The simulation module simulates lighting effects. The preferred simulation module is MAC ICON, available from Light & Sound Design Ltd., Birmingham, England. Other simulation modules, such as the one described in U.S. Pat. No. 5,423,554, may also be used.

The virtual reality operating system of the present invention provides an intuitive and simplified control over the simulation. The system also produces a three-dimensional image showing the lighting effects on the stage.

The three-dimensional image is displayed on one of display devices 30. These devices include a monitor 31 and an interactive helmet 32 of the type usually used as a virtual reality display device. The helmet 32 includes a pair of visual display devices, one for each eye. For example, the VR4 head mounted display, available from Virtual Research, may be used for this purpose. It will be appreciated that in such virtual reality display systems, the illusion of three-dimensions can be greatly enhanced by the use of the stereoscopic effect when generating the two visual displays. Also, the helmet may be equipped with a position/orientation tracker such as the FOB available from Ascension, Inc. This will allow the system to generate a visual display that shifts the display viewpoint in a realistic manner that corresponds to turning of the user's head.

Figure 2:
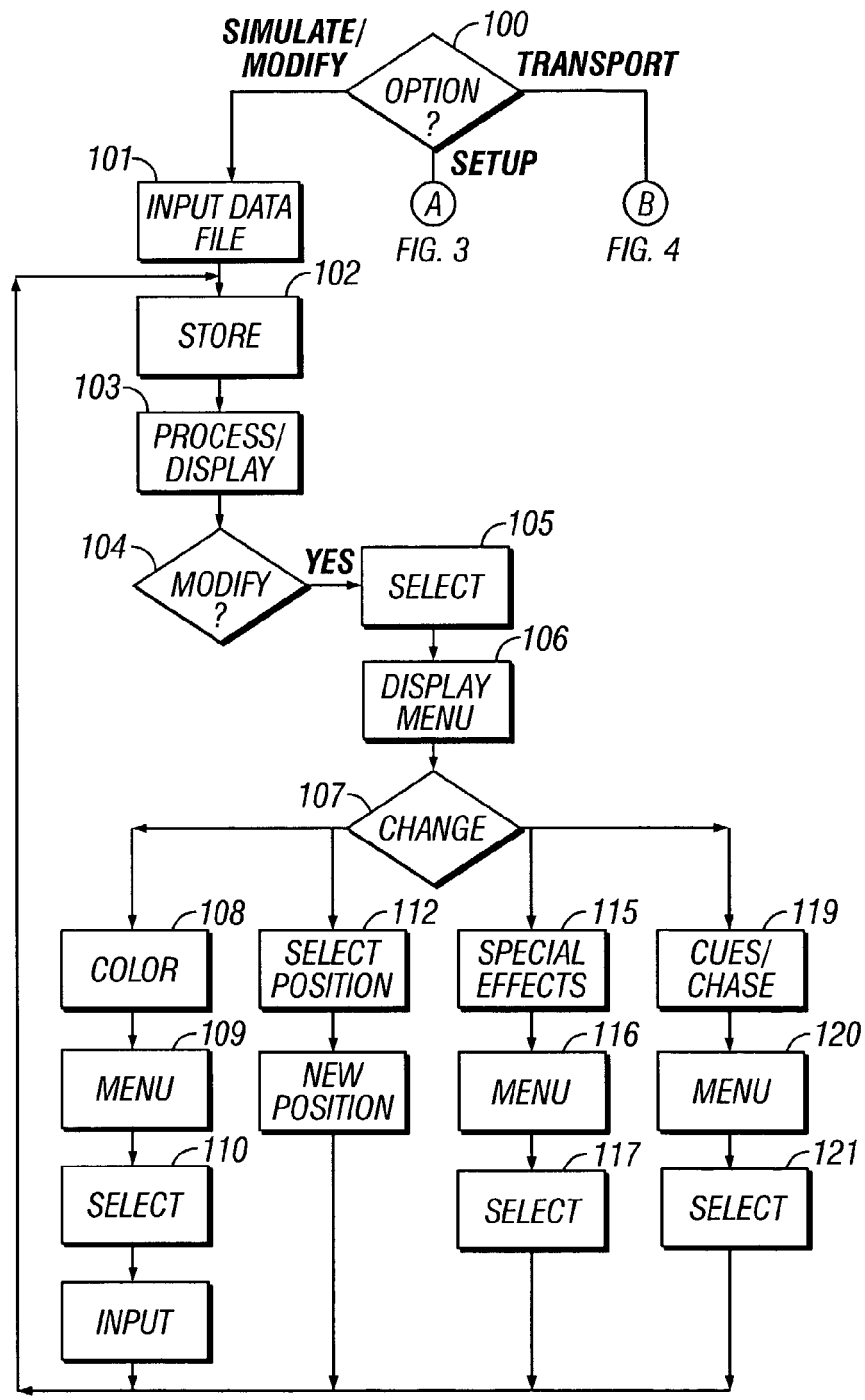
FIG. 2 shows a flowchart of the operation of the virtual reality lighting design system.

FIG. 2 shows an overall flowchart of the operation of the virtual reality lighting design system of the present invention. The process starts at step 100, where the user selects a design option. The preferred design options include simulation/modify lighting effects, light apparatus setup and transportation. The flowchart of operation in Figure shows the user selecting lighting effects, then at step 101, the user inputs a data file with database information about the lighting effects.

Alternatively, of course, the data file could be permanently stored as part of the simulating computer's memory.

The database information includes, for example the dimensions of the stage, the dimensions of each light fixture, the types of light fixtures, the point of reference on the stage, the location of each light fixture, the default parameters of each light fixture, any previous parameters of each light fixture and simulation data. The data is stored in a database in a form that can be used by, for example, MAC ICON at step 102. Step 103 represents MAC ICON processing the data in the database to produce a three-dimensional image on display device 30 simulating the lighting effects on the stage.

Step 104 presents the user with the opportunity to modify the lighting effect. This allows the user to reach into the virtual image of the stage and virtually grab one or more light fixtures to select. Three dimensional realism may be enhanced by including a simulated display of the user's hand as it reaches for the fixtures. The selected lights are indicated at step 105. A drop-down menu appears displaying several lighting options at step 106. The preferred lighting options include color, position, special effects, and cues/chase. Step 107 represents the user pointing to one of the lighting options, selecting a lighting option using voice command, or changing the light using some other technique. One technique allows changing the position of the light by grabbing and turning.

The user selects color at step 108, and the process proceeds to step 109, where another drop-down menu appears displaying a color palette. The user selects to a particular color from the color palette at step 110. The selected color is inputted at step 111, and the process returns to step 102 where the data regarding the selected color is stored at 102 and then re-processed at 103 in a database.

Step 112 represents the user selecting the position. This is followed by virtually grabbing the light fixture in the virtual reality space and pointing it in the desired direction. The new position is entered at 114. The process then returns to step 102 to update the memory and display.

The user selects special effects at step 115. Step 116 represents another drop-down menu displaying special effects options. The preferred special effects options include iris, shutter, gobo, and strobe. The user points to a special effects option at step 117. The process returns to step 102 for storing the new data and proper display.

The user can select cues/chase at step 119, and the process goes to step 120, where another drop down menu appears displaying cues/chase options based on those parameters that were already stored. The user points to a cues/chase option at step 121 and the process returns to step 102.

As will be appreciated, the above system allows a three dimensional simulation of the three dimensional lighting operation and effect. Hence, that simulation is more realistic and easier to understand than the usual two dimensional simulation. This enables less-experienced operators to have more meaningful input into producing the lighting effect. It also allows more flexibility in modeling the effects produced by the lights. Moreover, this allows using a three dimensional user interface and simulation to simulate the three dimensional lighting space.

Figure 3:
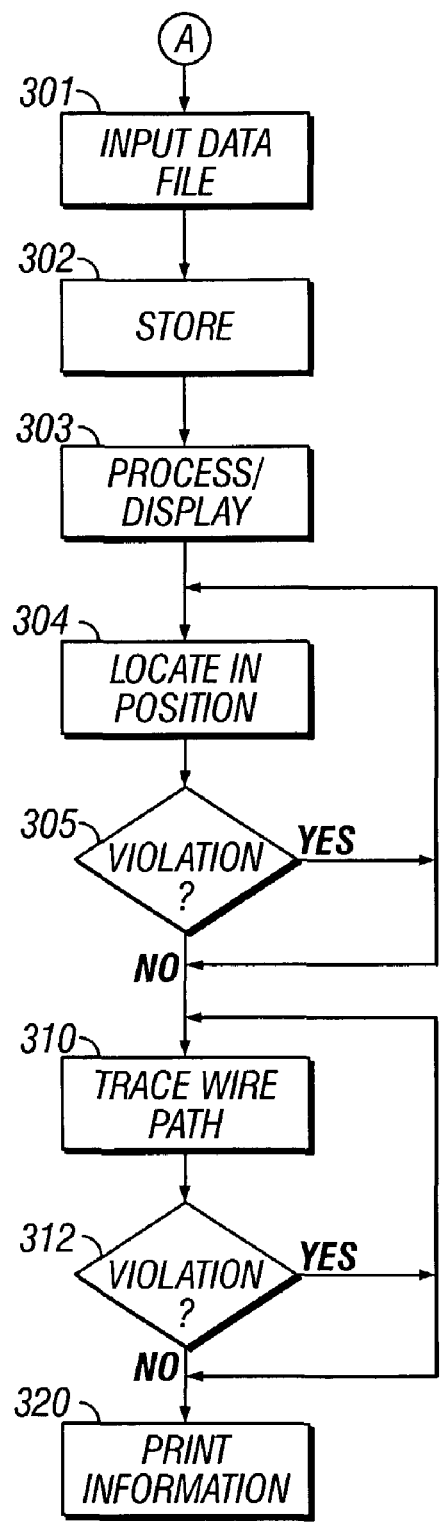
FIG. 3 shows another flowchart of the operation of the virtual reality lighting design system.

If the user selects equipment setup at step 100, flow passes to the FIG. 3 flowchart. At step 301, the user inputs a data file with information indicating sizes and weights of the lighting components, cable entry points, rigging, trusses, cables information, and dimensions and specifications of the building on which this equipment is to be supported.

The data is stored at step 302. The data in the database is processed to render a three-dimensional image that shows the interior of the building, the stage, and the lighting and sound equipment at step 303. Importantly, this also includes load points, where lights, etc. will be hung. Typically, lighting effects will have already been selected (in accordance with the above-described process) and thus, coordinate locations of at least some of the lighting equipment will be stored. The display will then show the desired lights in the specified locations.

Step 304 allows the user to place or relocate any light or other equipment. After that placement, the system recalculates loading on all elements to determine if any load parameter has been exceeded at 305. If so, a violation is flagged, allowing the option of relocating the device at 304, or continuing. This embodiment allows override of warnings. However, it should be understood that an alternate embodiment does not override the warnings. Yet another embodiment groups the warnings into critical warnings that can be overridden, and non-critical warnings that cannot be overridden.

This same system can be used for placement of trusses, rigging, lamps, dimmer rack consoles and every other part of the lighting system.

Many of these systems may require cabling. If so, the user traces the wire path at step 310. This is done by tracing along the path of the wire where the user wants the wire to be located. The system checks at step 312 for violation of any wiring conditions, such as a wire that is too long, too many wires in a harness or the like. As before, violation allows the user to either re-trace the wire path at step 310, or to continue.

The end result is a system, therefore which stores in its memory the position of every truss, lamp and every wiring location. Step 320 represents the system printing out a map of all of this information. This map includes cabling diagrams indicating cable, and the beginning and end locations as well as its routing. Preferably it also includes a cable number, and a label to be placed on that cable. This allows the technician to make the cables, label them, and later to place them in the proper location.

Figure 4:
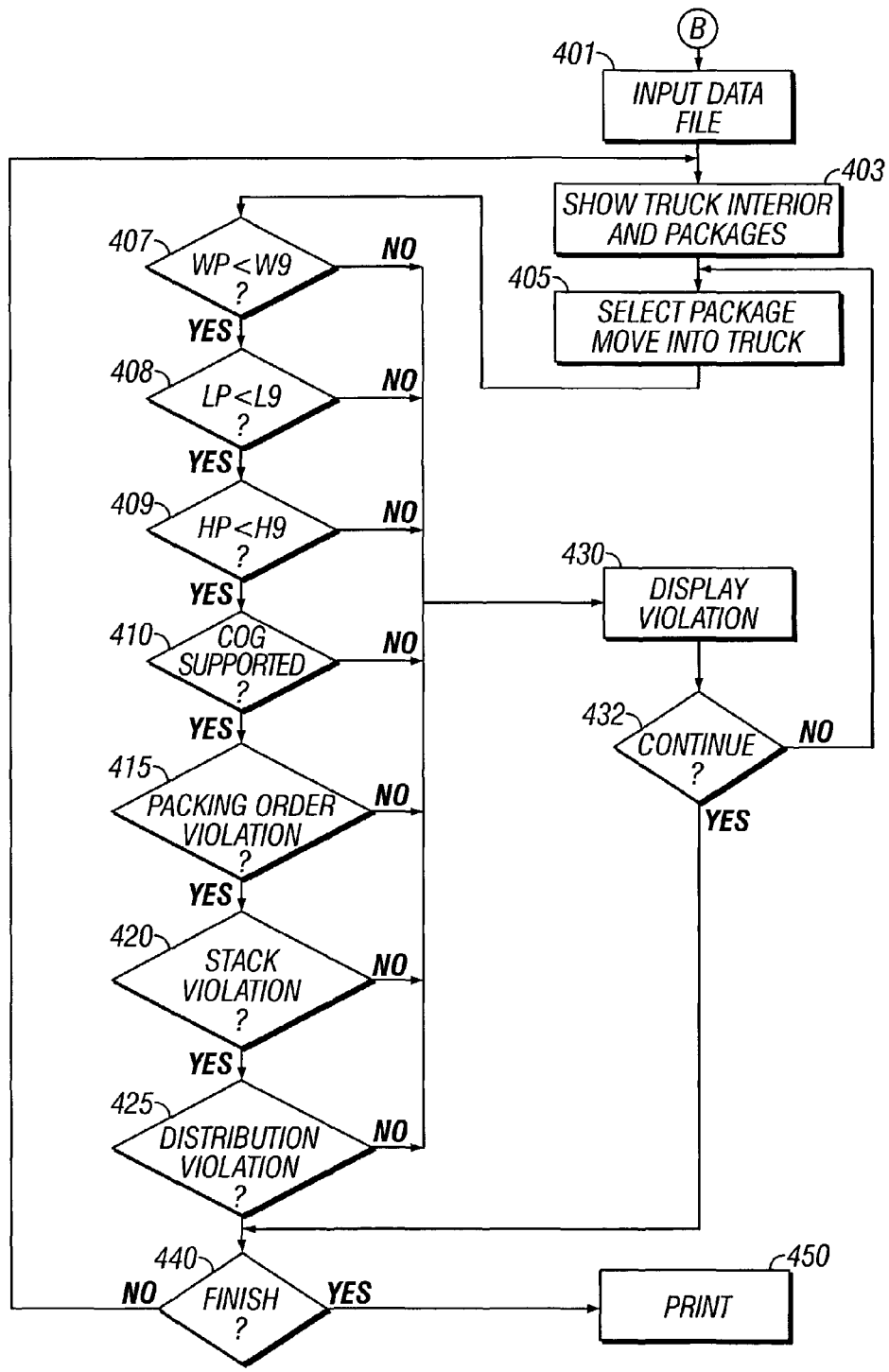
FIG. 4 shows a flowchart of the operation of the virtual reality light and sound equipment packing system.

If the user has selected transportation at step 100, flow passes to the flowchart of FIG. 4. FIG. 4 shows the flowchart of the truck packing routine preferrably used according to the present invention. As before, the user enters a data file with truck packing information at step 401. This data file includes data regarding the dimensions of the interior of the truck, the dimensions of each package for each lamp used in the lighting show, the center of gravity of each package, stacking rules for each package, truck location preferences for each package, truck weight loading requirements for each part of the truck, order of loading preference, an approximate time to load the package into the truck for each item, and a list of those items. That list could be obtained from the list of lighting equipment that is developed as part of the setup routine of FIG. 3, for example.

At step 403, the data in the database is processed to display a three-dimensional image showing the interior of the truck, the packages inside the truck and any that are outside the truck.

At step 405, a package is selected and moved to a desired location in the truck. The processing subsystem then determines a number of violation issues.

First, the system determines whether the selected package can fit in the truck at the desired location at 407 based on outer package diameter, and remaining truck cargo area.

The processing subsystem compares the width of the selected package (Wp) with the available width in the truck interior at the desired location (Wa) at step 407.

At step 408, the processing subsystem compares the length of the selected package (Lp) with the available length at the desired location (La).

The processing subsystem compares the height of the selected package (Hp) with the available height at the desired location (Ha) at step 409.

The processing subsystem then determines whether the center of gravity of the selected package (Gp) is supported at the desired location at step 410. For example, certain size boxes might not be supported stably at certain locations—e.g. if their center of gravity is not above a supporting position, they could tip.

In particular, at step 415 the processing subsystem determines if this package violates the order preference for loading and unloading.

Stackability rules are checked by the processing subsystem to determine if an underlying box has too much weight on top of it at step 420.

Step 425 determines the weight distribution on the truck. If the weight distribution on the truck is improper the process proceeds to step 403 wherein a three-dimensional image of the truck with the package outside is displayed.

If any of these violations at steps 407 to 409, 410, 415, 420 or 425 are violated, then control passes to the violation handling routine 430 which displays the violation to the user, and questions whether the user wants to continue. If the user chooses to continue at step 432, control remains in the main flow. As described above, the user may be given an option to return to step 405 and given an opportunity to re-select the package and position.

At step 440 the determination is made of whether the process is finished. This can be determined by manually indicating that the process is finished, or by running out of room in the truck. If the process is not finished, the flow returns to step 403 where the truck is shown with its interior and all packages.

If the process is completed at step 440, control passes to step 442 where a list of the information is printed. This list includes the packing order, giving package numbers or, in the case of many different packages being equally generic, simply telling the type of package and where it is placed on the truck. Step 450 can also compute and print other additional information. One important piece of information is the loading and packing time. For each item, a determination can be made of how long it will take to package the item into its box, and put it on the truck. For instance, for an ICON™ lamp, it may be known that it will take one hour and ten minutes to package the lamp, and place it in the truck. By knowing how many people are doing the moving, step 450 can calculate an approximate time of loading to enable determination when the loading should begin. Other data can be entered as part of the data file, including the distance to the next show and other such information which determines a total time of transport. Moreover, unpacking information can be determined to decide how long it will take to unpack the truck. All of this information can be correlated by the computer into a form which determines the latest possible time when packing could begin.

Another feature is the formation of production information labels, indicating for example, the area to which the package will be unloaded.

Figure 5:
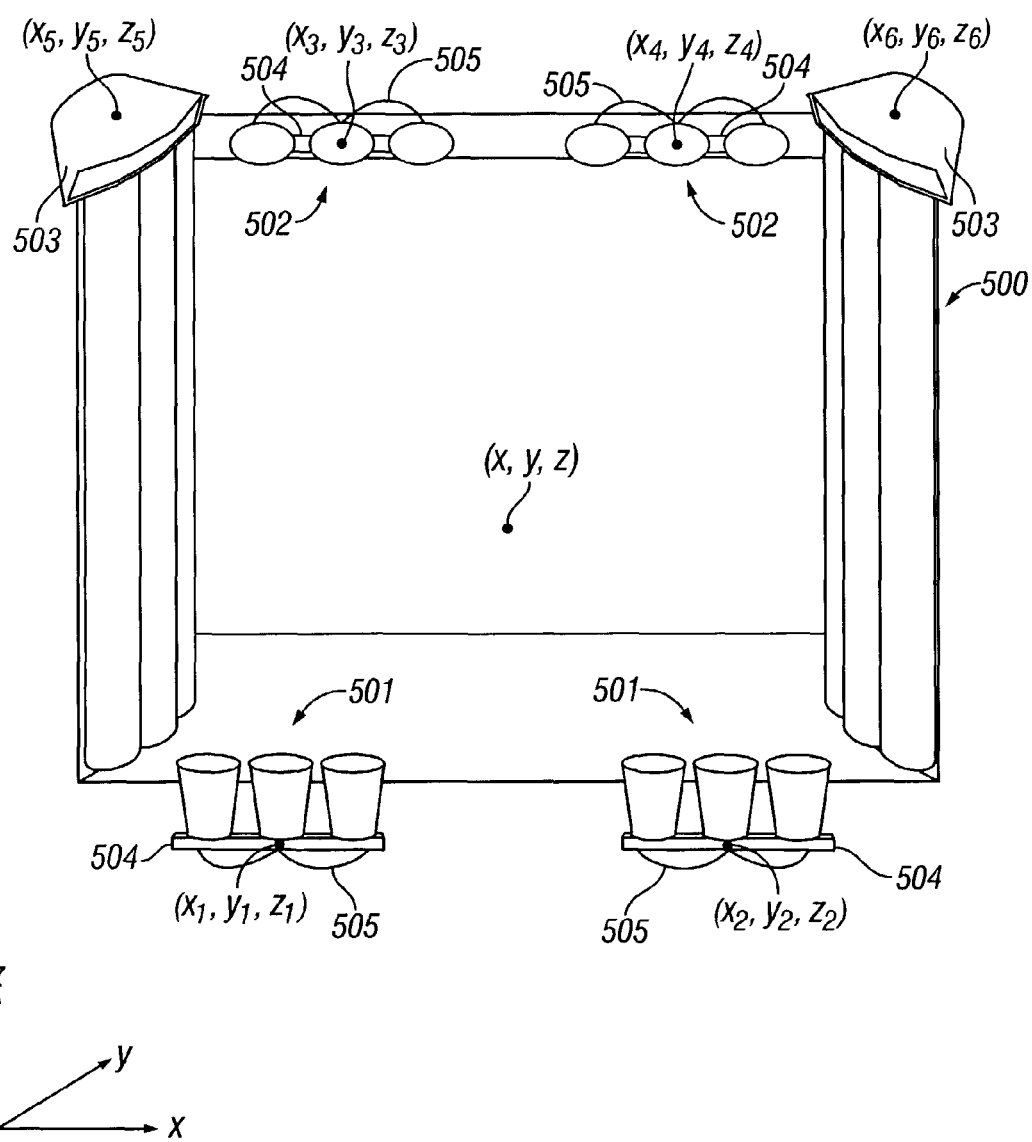
FIG. 5 shows a typical virtual image of a stage showing the lighting effects on the stage.

FIG. 5 shows a typical virtual image of a stage and the lighting equipment. The stage 500 has a point of reference (x,y,z). The light fixtures are located about the stage 500 in relation to the point of reference. The light fixtures can include any kind of light fixtures, including LSD ICON™ 501, LSD WASHLIGHT™ 502, special effects lights 503 and other types of light fixtures. LSD ICON™ lights 501 are located at (x1,y1,z1) and (x2,y2,z2). LSD WASHLIGHT™ 502 are located at (x3,y3,z3) and (x4,y4,z4). Special effects lights 503 are located at (x5,y5,z5) and (x6,y6,z6). The light fixtures are supported by trusses 504 and connected by cables 505.

Figure 6:
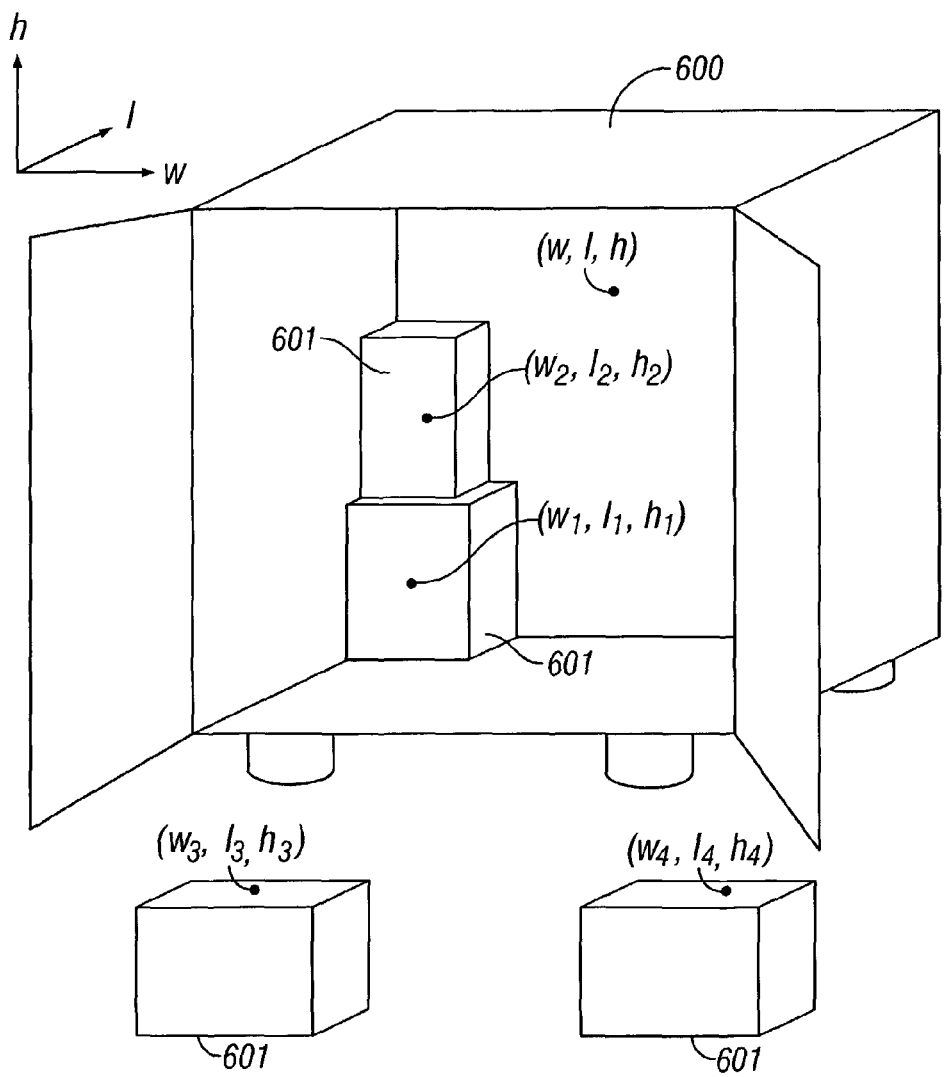
FIG. 6 shows a typical virtual image of a truck and various packages.

FIG. 6 shows a typical virtual image of a truck showing packages inside and outside the truck. The truck 600 has a point of reference at (w,l,h). The packages 601 are located in locations within the truck 600 in relation to the point of reference. The packages 601 in the truck are located at (w1,l1,h1) and (w2,l2,h2). The packages 601 outside the truck are located at (w3,l3,h3) and (w4,l4,h4).

Another embodiment of the invention enhances the lighting simulation of FIG. 1 by combining that simulation with a playing of the musical information. This allows sound playback at the same time as the light show simulation. This allows a virtual reality simulation of the way that the light show simulation will interact with the sound.

Yet another operation allows using the virtual reality subsystem as an entertainment device. The uses the virtual reality space as a medium for a karaoke-like simulation.

The flowcharts given above have described how a simulation of the light show can be used to obtain a three dimensional simulation of the light show in its operation. This embodiment adds to that simulation, a video of the band playing. This can be done on a blue screen, for example, so that band is shown playing the song that they are playing, along with the light show. However, the song which the band is playing is divided into tracks, and at least one of those tracks is removed.

Figure 7:
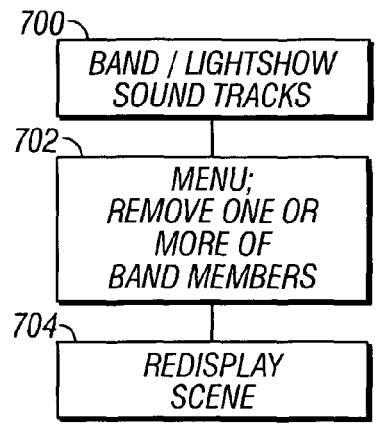
FIG. 7 shows a flowchart of operation of the virtual karaoke system of the present invention.

The operation is shown in FIG. 7 where the flowchart shows the band, light show and sound and tracks being displayed in the virtual reality environment at steps 700. Step 702 represents the user selecting from a menu, and removing one or more of the band members. For example, the user can drag the singer off the stage into a computer wastebasket sitting by the side of the stage. The singer does not participate in the simulation while in the wastebasket. The voice track of the singer is also removed. This allows redisplay of the entire scene at step 704, with the desired track/artist removed.

The operator can return the removed band members to the stage at any time from the wastebasket, or may change any aspect of the simulated concert including stopping the concert. This allows a virtual karaoke system.

Moreover, the virtual reality tool as used herein can be used as either a production tool or as a presentational device. For example, while the normal virtual reality system interacts with a single person, the present application contemplates using a number of persons in the virtual reality subspace. For example, two or more different people could be observing the same effect from different vantage points. This can allow any of the above techniques to be seen by many people. Preferably, the virtual reality technique allows simulation of the entire lighting system including the lighting and sound.

Although only a few embodiments have been described in detail above, those having ordinary skill in the art will certainly understand that many modifications are possible in the preferred embodiment without departing from the teachings thereof.

For example, additional lighting and packing parameters may be made selectable for user input besides those discussed above. Additional features can be added to the user interface, for example, voice output by the system may be used to prompt the user, or to warn the user when certain rules and conditions are violated. Also, additional calculations may be performed to facilitate the routing of cables, for example, by giving the user immediate feed back as to the length of a particular route so that it can be compared to other alternative routes. Furthermore, it will be appreciated that the principles of the virtual reality lighting design system can be easily applied to sound systems and sound system equipment apparatus and packing. Also, the teachings of the present invention, utilizing the virtual reality truck packing system, can be applied generally to the packing of many other kinds of goods and packages into trucks, containers, rail cars, or other transport vehicles and storage environments.

All such modifications are intended to be encompassed within the following claims.

What is claimed is:

1. A method for designing a lighting display comprising:
    inputting a plurality of parameters relating to lighting devices, supporting elements for said lighting devices and surrounding structure, at least one of said parameters being a maximum capability parameter, related to a maximum capability of said lighting devices, supporting structure for said lighting devices and surrounding structure;
    displaying a simulation of the lighting devices, their supporting elements and surrounding structure;
    displaying a simulation of electrical cables interconnecting the lighting devices to a source of power;
    placing said lighting devices, supporting structure for said lighting devices and surrounding structure in the simulated display at specified locations in response to input by a user;
    changing the simulated display to reflect changes in placement by the user; and
    determining whether the placement of lighting devices by the user violates said maximum capability parameter; and
    informing the user of said violation of said maximum capability parameter.

2. The method of claim 1 further comprising placing cables connecting the lighting devices and locations in the simulation as defined by the user; and calculating the length of the cables in the defined locations; and outputting a display indicating the length and location of said cables.

3. A method as in claim 1, wherein said violations comprise a violation of a wiring condition for the light.

4. A method as in claim 3, wherein said violation comprises a wire that is too long.

5. A method as in claim 1, wherein said parameters include weight handling capability of said supporting elements and/or supporting structure, and weights of said lighting devices, and said violation comprises excessive loading on one of said supporting elements and/or supporting structure.

6. A method as in claim 1, further comprising providing a critical violation which cannot be overridden by a user, and a noncritical violation which can be overridden by user.

7. A lighting display simulation method, comprising:
    obtaining a data file with a plurality of sizes and weights of lighting components, supporting structure for the lighting components, and lighting characteristics of the lighting components;
    allowing simulation of output lighting produced by said lighting components by simulating placing the lighting components on appropriate locations on the supporting structure, and using said lighting characteristics to produce a simulated lighting output;
    based on said locations, determining if a loading parameter of the supporting structure has been exceeded; and
    providing an indication of a violation if said loading parameter has been exceeded, and allowing the user to select a new location for the lighting component when said loading parameter has been exceeded.

8. A method as in claim 7, further comprising checking to determine a necessary wiring to said lighting component, and further checking to determine if said wiring violates any wiring rules, and providing an indication of a violation if any of the wiring rules have been exceeded.

9. A method as in claim 8, further comprising determining whether the violation represents a critical warning or a non-critical warnings, and allowing said noncritical warning to be overridden, but preventing said non-critical warnings from being overridden.

* * * * *